United States Patent Office 2,965,453
Patented Dec. 20, 1960

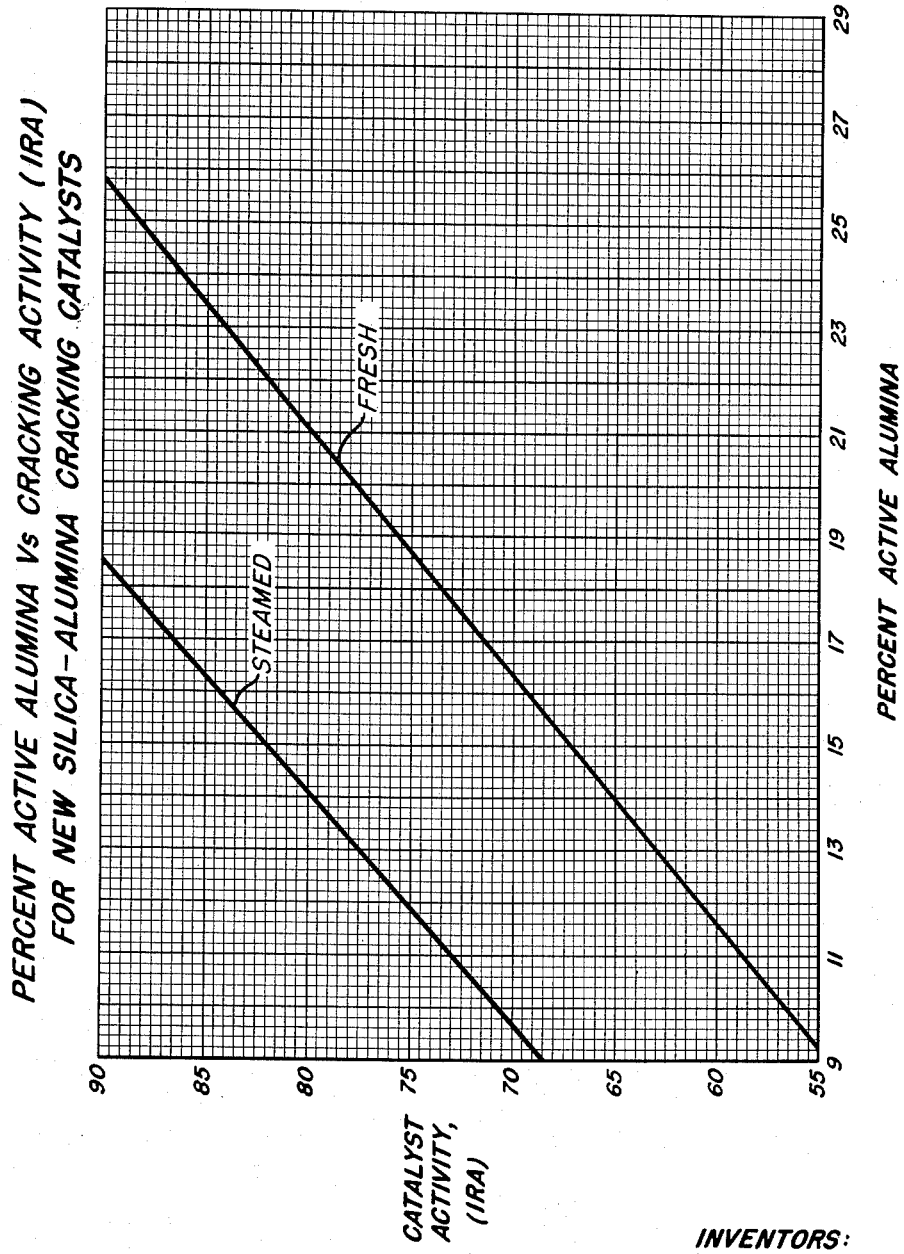

2,965,453

DETERMINING ACTIVITY OF SILICA-ALUMINA CATALYST

Jerry W. Harlan, Hammond, Ind., and Albert L. Hensley, Jr., Lansing, Ill., assignors to Standard Oil Company, Chicago, Ill., a corporation of Indiana Filed Nov. 18, 1957, Ser. No. 697,009

12 Claims. (Cl. 23—230)

This invention relates to silica-alumina composites and more particularly to a method for determining the hydrocarbon cracking activity of silica-alumina catalysts.

Silica-alumina catalytic composites are used extensively in petroleum refining, e.g., in the catalytic cracking process ("Advances In Catalysis," vol. VI, Academic Press Inc., 1954, pages 271–434) for conversion of hydrocarbons, such as virgin and cokestill gas oils, into lighter fractions of greater value. The silica-alumina catalyst may be naturally-occurring or synthetically-produced and may be in the form of pills, pellets, balls, powder, microspheres, and the like. When ordering such catalyst it is customary to specify any or all of such physical characteristics as size, configuration, density, pore volume, surface area, percent total alumina, and the like, and/or such performance characteristics as carbon factor (tendency to produce carbon) and activity. Activity is, of course, of primary importance and may be expressed as some significant result of a cracking test, such as yield or quality of one of the cracked products, or may be reported in terms of the ratio of the amounts of reference and test catalyst required to achieve the same degree of cracking at otherwise identical conditions.

Silica-alumina catalyst activity can sometimes be estimated by means of a physical or chemical test, such as, heat of wetting with methanol (Mills, I.W., proc. Am. Petroleum Inst. 27, III, 29, 1947), titration with KOH in the presence of 5% solution of sodium chloride (Grenall, A., Ind. Eng. Chem. 41, 1485, 1949), titration with n-butylamine in a non-aqueous medium (Tamele, M.W., Discussions Faraday Soc. No. 8, 270, 1950) and the like. Such methods, however, are often time consuming, have not always proved reliable, and usually require a different correlation for each type of commercially-available or experimental silica-alumina catalyst. Thus, to obtain a reliable measure of activity, generally applicable to many common types of silica-alumina catalyst, there has heretofore been no satisfactory substitute for an actual pilot-plant cracking test in which oil is processed under conditions simulating those employed in commercial operations. Such pilot-plant cracking tests, unfortunately, are also time-consuming and expensive. For example, a single test to determine the "Indiana Relative Activity" (abbreviated as "IRA") of a silica-alumina catalyst (Shankland, R.V., and Schmitkons, G.E., Proc. Am. Petroleum Inst. 27, III, 57, 1947) costs about $300 at present price levels.

The active component of silica-alumina cracking catalyst is aluminum combined as aluminosilicate, i.e., aluminum attached by Al-O-Si bonds to the silica lattice, also referred to hereinafter as combined or active alumina. Alumina and silica, either alone or physically mixed with one another, have negligible cracking activity. The aluminosilicate content of the catalyst also influences activity stability and surface stability, the higher the content the higher the stability. It is therefore an object of this invention to provide a method for determining the aluminosilicate content of silica-alumina cracking composites. It is another object of our invention to provide an inexpensive measure of the activity, activity stability, and surface stability of silica-alumina catalysts for the conversion of hydrocarbons. These and other objects of our invention will become apparent from the detailed description of the invention and the operating examples.

We have discovered a quick, inexpensive, and simple method for accurately determining the amount of active or combined alumina in synthetic silica-alumina composites, i.e., the amount of alumina in the form of aluminosilicate. Our method comprises the steps of immersing or suspending the catalytic composite in an excess of an aqueous solution of a soluble alkali metal fluoride, said solution having a preselected pH within a selective-reaction-pH range, as hereinafter defined, and adding sufficient acid-forming or acidic material, preferably a strong acid, to said solution to maintain the pH of said solution within said range for a preselected period in the range of about 0.2 to 2 hours, preferably 0.5 to 1.5 hours, optimally about 1.0 hour, and to adjust the pH of said solution to said preselected pH at the end of said preselected period. The total amount of acidic material added provides a measure of the aluminosilicate content of the catalytic composite.

Our method is applicable to the determination of the alumino-silicate content of both fresh and used silica-alumina composites. For fresh, unused composites the "selective-reaction-pH range" is about 8.0 to 8.8, and we prefer a pH of about 8.4. For catalysts which have been used substantially for catalytic cracking (850–1050° F.), including regeneration (1000–1200° F.), or have otherwise been subjected to substantial heating and/or steaming, such as is sometimes used to "stabilize" fresh catalyst prior to a pilot-plant-activity determination (i.e., a standard treatment with about one atmosphere of steam at about 1200° F. for about 16 hours), the "selective-reaction-pH range" is about 7.4 to 8.2, and we prefer a pH of about 7.8. In the attached figure we present, for convenience, correlations whereby aluminosilicate content (active alumina) as above determined for fresh and steamed catalysts can be translated directly into an activity measurement (IRA). For other silica-alumina composites, e.g., used or otherwise heat-deactivated catalysts, general or special correlations may be readily developed as hereinafter described. In practice, however, we have found most interest center about the use of our invention for determining activity of fresh, unused catalyst.

The mechanism of our invention appears to be the selective reaction of aluminosilicate with the fluoride ion to form 3 hydroxyl ions (OH−) per atom of aluminum combined as aluminosilicate. Expressed another way, six base ions (OH−) are produced per molecule of active alumina. Thus, the amount of acid required to maintain pH provides a direct measure of active alumina, and thus catalyst activity. This selective reaction takes place only within the pH ranges above indicated, i.e., 8.0 to 8.8 for the fresh catalyst and 7.4 to 8.2 for the used or steamed catalyst. A pH below the range appears to bring about substantial reactions of other constituents of the catalyst, i.e., uncombined alumina and silica. A pH above the range appears to result in some sort of undefined interference with the selective reaction of alumino-silicate and fluoride ion. The above theory, however, is presented as one possible explanation of the mechanism of our invention and we do not necessarily wish to be bound or limited thereby. Regardless of the mechanism, we have found that under the carefully-controlled conditions of our method the amount of acid required to maintain pH provides an accurate measure of active alumina and, thus, catalyst activity.

In practice, the active alumina can be calculated directly from the amount and strength of acid required to maintain pH, as hereinafter described. Alternatively, the amount of acid of given strength required for a given quantity of catalyst as compared with the amount of acid for a standard reference catalyst of known activity can be used as a measure of relative activity. Another alternative, as mentioned above, is to correlate either the amount of acid required or the calculated percent active alumina with any of the conventional measures of activity, such as, Indiana Relative Activity (IRA).

Examples of water-soluble alkali metal fluorides in the practice of our invention are sodium fluoride, potassium fluoride, cesium fluoride and rubidium fluoride, preferably sodium fluoride. Lithium fluoride is considered unsuitable because of limited solubility. An "excess" of the alkali metal fluoride must be present to insure reaction of substantially all combined alumina. "Excess" for purposes of this invention, therefore, means at least that volume of an aqueous solution alkali-metal fluoride that will envelop the sample and will also supply fluoride ions in sufficient quantity to react with all combined alumina present. A quantity substantially greater than such minimum is preferred.

As pointed out above, pH of the aqueous or water solution of the alkali metal fluoride is critical in the practice of the present invention. At the beginning of the test, that is, just prior to immersing the catalyst to be tested, pH should be adjusted to some preselected value within the selective-reaction-pH range above indicated. Adjustment may be made by addition of an acid or base, e.g., hydrochloric acid or sodium hydroxide. During the test period the pH is maintained within the selective-reaction-pH range by continuous or incremental addition of acid-forming or acidic material, preferably a strong acid. Examples of acids found particularly advantageous for maintaining and adjusting pH in the practice of my invention are perchloric acid, hydrochloric acid, sulfuric acid, nitric acid, and the like. Such strong acids are preferred to avoid any possibility of a buffer effect.

A preferred technique is to maintain the pH at substantially the preselected value throughout the period. For this purpose, an automatic titration apparatus is advantageously used, such as, for example, a Beckman Model K Automatic Titrator (described in Bulletin 239–A, November 1950, Beckman Instruments Inc.). If, however, at the end of the reaction period the pH is higher than the preselected value it can readily be adjusted thereto by further addition of the acid. Of course, if the pH is less than the preselected value at the end of the period as the result of excess acid addition, a basic material may be added to raise it to the preselected pH. This, however, complicates the subsequent calculation of percent aluminosilicate and activity. It is generally preferred to repeat the experiment rather than to attempt to correct for this situation.

The time during which the silica-alumina composite is immersed in the alkali-metal fluoride should be sufficient to permit reaction of substantially all active alumina. The rate of reaction, however, depends somewhat on temperature and pore volume and surface area of the silica-alumina composite. The activity determination may be carried out at temperatures up to about the boiling point of the aqueous alkali metal fluoride solution. For fresh silica-alumina composites preferred temperature range is about room temperature to about 110° F. For used or steamed silica-alumina composites preferred temperature range is about 160 to 200° F. Within the preferred temperature ranges experience has shown that substantially all active alumina in the silica-alumina composite is reacted in about 1 hour. The reaction time should not substantially exceed about 2 hours because other undesired and interfering reactions may occur in significant amounts and thus raise doubts about or destroy the accuracy of the determination.

To decrease the time for an activity determination, the test may be terminated in less than about 1 hour, particularly for fresh silica-alumina catalysts with comparatively large pore volumes, e.g., greater than about .4 cubic centimeter per gram, and large surface areas, e.g., greater than about 400 square meters per gram. With such catalysts the reaction may be substantially complete in about 0.5 hour. Even where the aluminosilicate-fluoride reaction has not come to completion, experience may provide a suitable correction factor to be applied, depending upon the particular time used. However, reaction periods of less than about 0.2 hour are considered undesirable because of the potential inaccuracy inherent in such short periods. In general, a period of 0.5 to a period of 1.5 hours is preferred, and 1 hour is considered optimum. The reaction is not pressure sensitive, and, thus, pressure may be atmospheric, or higher.

Our method of determining aluminosilicate content and activity of silica-alumina catalyst is very advantageously used with fresh silica alumina composites with surface areas above about 400 square meters per gram and pore volumes in excess of about 0.4 cubic centimeter per gram. A fresh silica-alumina hydrocarbon cracking catalyst in powdered form, as used in the fluid catalytic cracking process, typically has a surface area in the range of about 500 to 600 square meters per gram and a pore volume of about .5 to 1.1 cubic centimeters per gram. Catalyst with surface areas and pore volumes substantially less than those above indicated, for example, used or steamed catalysts, can also be tested in accordance with the present invention by application of simple correction factors developed from experience. For example, for a number of used catalysts with surface areas substantially below about 400 square meters per gram and pore volumes substantially below about 0.4 cubic centimeter per gram, activity has been found to correlate as a direct function of active alumina and surface area and an inverse function of pore volume, such as:

$$\frac{(\text{Active Alumina})^{1/2} \times (\text{Surface Area})^{5/2}}{\text{Pore Volume}}$$

The invention will be more clearly understood from the following detailed description of an activity determination read in conjunction with the accompanying drawing which forms a part of this specification.

About 100 milliliters of one molar sodium fluoride solution are added to a 250 milliliter beaker and placed on a magnetic stirrer. Two drops of phenolphthalein indicator are added to the solution which is then titrated with 0.1 normal hydrochloric acid, or 0.1 normal sodium hydroxide, to a faint pink end-point, thereby indicating a pH of 8.4. About 0.3 to 0.4 gram of fresh silica-alumina catalyst is then immersed in this solution at about room temperature and 0.1 normal hydrochloric acid is added at a rate which will keep the suspension close to the end point, as determined by a faint pink color. (As previously indicated, acid additions must be controlled throughout the test on fresh silica-alumina catalyst so that pH of the solution remains within the range of 8.0 to 8.8.) This titration is continued for one hour and is terminated at the end of said hour with the solution at its end point of pH 8.4. The percent active alumina, i.e., aluminosilicate, in the original sample is then calculated by means of the following formula:

$$\text{Percent Active Alumina} = \frac{(M)(N)(.7)}{(W)\left(1 - \frac{V}{100}\right)}$$

where $M$ = milliliters of standard HCl solution
$N$ = normality of standard HCl solution
$W$ = weight of catalyst sample in grams
$V$ = weight percent volatile matter in the catalyst Weight percent of volatile matter (V) in the above equation may be determined by any means of the prior art. For example, a sample of the catalyst may be weighed, placed into a tared platinum crucible, heated in a muffle furnace at 1000° C. for two hours, and reweighed. Percent volatile matter (V) may then be computed from the loss in weight by means of the following formula:

$$V = \frac{(\text{Loss in weight}) (100)}{(\text{Sample weight})}$$

If used or steamed catalyst is being tested, the procedure is essentially the same except that the pH is in the range of about 7.4 to 8.2 and temperature is in the range of about 160° to 200° F.

Cracking activity, that is, Indiana Relative Activity (IRA), for fresh or steamed catalyst may then be determined from the percent active alumina by means of correlations in the accompanying figure. These correlations are applicable only to fresh catalyst and catalyst which has been steamed under standard conditions, i.e., atmospheric steam at about 1200° F. for about 16 hours. For other catalysts, e.g., used catalysts, heat-deactivated catalysts, so-called equilibrium catalysts, catalysts steamed under other-than-standard conditions, and the like, a more-generalized correlation which takes into consideration other factors, such as surface area, pure volume, and the like, as above suggested, may be prepared. Since practically all interest centers about fresh catalyst, however, we prefer the specialized correlation for fresh catalyst presented in the drawing, particularly in as much as surface area and pore volume determinations are not required.

In the drawing the correlation for steamed catalyst is displaced to the left of the correlation for fresh catalyst. This illustrates the specialized nature of the correlations. It results from the fact that steaming substantially reduces surface area, pore volume, and the amount of active alumina which under actual cracking conditions appears to break down or otherwise does not contribute to activity. Separate specialized correlations correct for this situation. Thus, when the same catalyst, both before and after standard steaming, is tested in accordance with the method of the present invention, the same Indiana Relative Activity (IRA), within experimental error, is obtained by using the appropriate specialized correlation in each case. Of course, as indicated hereinabove, a single generalized correlation could be used, but this would require determination of surface area and pore volume, as well as aluminosilicate content (active alumina). Determination of all three factors may cost (in terms of money and/or time) almost as much or more than an actual pilot plant activity test.

By means of our method of activity determination specifications for silica-alumina cracking catalyst can be simplified. For example, it is customary at present to specify, among other things, both total alumina content and some measure of activity, such as Indiana Relative Activity (IRA). The method of the present invention would permit elimination of both of these specifications and, in their place, would permit substitution of a single, readily-determinable value, such as amount of acid used in our test procedure, the calculated percent active alumina (aluminosilicate), or a correlated Indiana Relative Activity, as hereinabove described.

The following examples illustrate our invention and the accuracy obtained therewith, when applied to the determination of Indiana Relative Activity (IRA) of fresh and steamed silica-alumina cracking catalysts.

*Examples—Fresh catalyst*

A series of tests were run on commercially-produced silica-alumina cracking catalyst prepared by four different catalyst manufacturers. Samples of catalyst produced by each manufacturer were subjected to an actual Indiana Relative Activity test (Shankland, R. V., and Schmitkons, G. E., Proc. Am. Petroleum Inst. 27, III, 57, 1947). Results are tabulated in the table below under the column, "IRA from Actual Test." Another sample of each of these same catalysts was tested by the method of the present invention, as described in further detail below, and the Indiana Relative Activity (IRA) determined from the correlation presented in the accompanying figure. The results are tabulated below under the title "IRA from Correlation."

To determine Indiana Relative Activity (IRA) by the method of the present invention, 0.3 to 0.4 gram of each of the cracking catalyst samples were placed in a 250 milliliter beaker containing 100 milliliters of 1 molar sodium fluoride solution, having a pH of 8.4. The solution was titrated at a temperature of about 80° F. with a 0.1 normal solution of hydrochloric acid for a period of 1 hour at said pH of 8.4, using a Beckman Model K Automatic Titrator (Bulletin 239-A, November 1950, Beckman Instrument Inc.). The percent active alumina was then calculated by means of the formula described hereinabove, and the corresponding IRA read from the accompanying correlation for fresh catalyst. The results are as follows:

| Percent Active Alumina | IRA from Actual Test | IRA from Correlation | ΔIRA |
|---|---|---|---|
| 9.2 | 55 | 55 | 0 |
| 9.2 | 56 | 55 | −1 |
| 9.6 | 56 | 56 | 0 |
| 11.0 | 59 | 59 | 0 |
| 13.4 | 64 | 64 | 0 |
| 14.5 | 65 | 66 | +1 |
| 16.0 | 67 | 69 | +2 |
| 16.4 | 68 | 70 | +2 |
| 16.4 | 70 | 70 | 0 |
| 16.5 | 72 | 71 | −1 |
| 16.9 | 70 | 71 | +1 |
| 16.9 | 74 | 71 | −3 |
| 17.5 | 74 | 73 | −1 |
| 17.7 | 72 | 73 | +1 |
| 19.0 | 76 | 76 | 0 |
| 21.5 | 81 | 81 | 0 |
| 22.5 | 83 | 83 | 0 |
| 23.6 | 85 | 85 | 0 |
| 25.1 | 88 | 88 | 0 |

*Examples—Steamed catalyst*

A similar series of tests were run on other samples of commercially-produced catalysts which had been subjected to steaming under standard conditions, i.e., one atmosphere of steam at 1200° F. for 16 hours. The tests were carried out in a similar fashion except that temperature and pH of the sodium fluoride solution were maintained at about 185° F. and about 8.0 respectively. Automatic titration was not used because glass electrodes of the automatic titrator would deteriorate rapidly in sodium fluoride at 185° F. The results are as follows:

| Percent Active Alumina | IRA from Actual Test | IRA from Correlation | ΔIRA |
|---|---|---|---|
| 6.8 | 63 | 63 | 0 |
| 8.2 | 66 | 66 | 0 |
| 8.2 | 70 | 66 | −4 |
| 9.4 | 70 | 69 | −1 |
| 10.0 | 71 | 71 | 0 |
| 12.4 | 71 | 76 | +5 |
| 11.6 | 76 | 75 | −1 |
| 10.6 | 76 | 76 | 0 |
| 14.0 | 76 | 80 | +4 |
| 14.2 | 79 | 80 | +1 |
| 15.6 | 83 | 80 | −3 |
| 15.6 | 83 | 83 | 0 |
| 16.0 | 83 | 84 | +1 |
| 17.0 | 87 | 86 | −1 |

It can be seen from the last columns of the above tables that the method of the present invention gives results that are within ±5 IRA units of the actual Indiana Relative Activity (IRA). This is typical of the reproducibility of Indiana Relative Activity determinations.

While we have described our invention with reference to certain specific embodiments thereof, it is to be understood that such embodiments are illustrative only, and not by way of limitation.

This application is a continuation-in-part of our application Serial Number 643,073, filed February 28, 1957, now abandoned.

Having thus described our invention, we claim:

1. A method for determining aluminosilicate content of a silica-alumina catalytic composite, wherein said aluminosilicate content represents the active component of said composite, which comprises treating said catalytic composite in an excess of an aqueous solution of an alkali metal fluoride, said treating liberating 3 hydroxyl ions per atom of aluminum combined as said aluminosilicate, said solution having a preselected pH within a selective-reaction-pH range between about 7.4 to 8.8, titrating said solution by adding sufficient acidic material to said solution to maintain the pH of said solution within said range for a preselected period in the range of about 0.2 to 2 hours, and restoring the pH of said solution to said preselected pH during said preselected period, whereby the total quantity of said acidic material added provides a measure of the aluminosilicate content of said catalytic composite.

2. The method of claim 1 wherein said soluble alkali metal fluoride is sodium fluoride.

3. The method of claim 1 wherein said soluble alkali metal fluoride is potassium fluoride.

4. The method of claim 1 wherein said acidic material is a strong acid.

5. The method of claim 1 wherein said acidic material is hydrochloric acid.

6. The method of claim 1 wherein said silica-alumina catalytic composite is a fresh composite, said selective-reaction-pH range is about 8.0 to 8.8, and the temperature of said solution is below about 110° F.

7. The method of claim 1 wherein said silica-alumina catalytic composite had previously been subjected to catalytic cracking conditions, said selective-reaction-pH range is about 7.4 to 8.2, and the temperature of said solution is in the range of about 160 to 200° F.

8. The method of claim 1 wherein said silica-alumina catalytic composite has been contacted with steam at about 1200° F. for about 16 hours prior to immersion, said selective-reaction-pH range is about 7.4 to 8.2, and the temperature of said solution is in the range of about 160 to 200° F.

9. A method for determining the active alumina content of a fresh silica-alumina hydrocarbon cracking catalyst, wherein said active alumina is in the form of an aluminosilicate, which method comprises immersing said cracking catalyst in an excess of an aqueous solution of a water-soluble alkali metal fluoride, said solution having a preselected pH in the range of about 8.0 to 8.8, commingling a strong acid with said aqueous solution at such a rate and in such quantity as to maintain the pH of said solution within said range for a preselected period in the range of about 0.5 to 1.5 hours, adjusting said pH by means of said strong acid so that at the end of said preselected period the pH is at said preselected pH, whereby the total quantity of said strong acid required to maintain and adjust said pH provides a measure of the active alumina content of said cracking catalyst.

10. The method of claim 9 wherein said water-soluble alkali metal fluoride is sodium fluoride and said strong acid is hydrochloric acid.

11. A method for determining the relative activity of a silica-alumina hydrocarbon cracking catalyst which comprises contacting said catalyst with steam at about 1200° F. for about 16 hours, immersing the steamed catalyst in an excess of an aqueous solution of a water-soluble alkali metal fluoride at a temperature of about 160 to 200° F., said solution having a preselected pH in the range of about 7.4 to 8.2, commingling a strong acid with said aqueous solution at such a rate and in such quantity as to maintain the pH of said solution within said range for a preselected period in the range of about 0.5 to 1.5 hours, adjusting said pH by means of said strong acid to said preselected pH at the end of said preselected period, whereby the total quantity of said strong acid required to maintain and adjust said pH provides a measure of the active alumina content of said cracking catalyst.

12. A method for determining the relative activity, activity stability, and surface stability of a fresh silica-alumina cracking catalyst which method comprises suspending said catalyst in an excess of a water solution of sodium fluoride having a preselected pH in the range of about 8.0 to 8.8 and maintaining the pH of said solution substantially constant at said preselected pH for a preselected period in the range of about 0.5 to 1.5 hours by commingling hydrochloric acid with said solution during said preselected period, whereby the amount of said hydrochloric acid commingled with said solution during said period provides a measure of the relative activity, activity stability, and surface stability of said catalyst.

References Cited in the file of this patent

Milliken: Faraday Society Discuss., 1950, vol. 8, pp. 279–290.

Waton: Anal. Abstracts, Abstr. 732, 1956.

Chu et al.: Anal. Chem., vol. 27, #9, 1430, September 1955.

Thomas: "Ind. and Eng. Chem.," vol. 41, November 1949, pages 2564–73.

Grenall: Ibid., p. 1485.

Tarnele "Faraday Soc. Discussions," #8, p. 270, 1950.